Patented Nov. 20, 1934

UNITED STATES PATENT OFFICE 1,981,360

PRODUCTION OF ARALKYLARYL CARBOXYLIC ACIDS

Alphons O. Jaeger, Mount Lebanon, and Lloyd C. Daniels, Crafton, Pa., assignors, by mesne assignments, to American Cyanamid & Chemical Corporation, a corporation of Delaware No Drawing. Application February 27, 1931, Serial No. 518,903

11 Claims. (Cl. 260—64)

This invention is directed to the production of aralkylaryl carboxylic acids in which the aralkyl group is mononuclear.

According to the present invention mononuclear aryl compounds having a molecular weight greater than 78 are caused to react with phthalides or with homologues or substitution products of phthalide in the presence of aluminum chloride under the conditions of the ordinary Friedel-Crafts reaction used with phthalic anhydride to produce keto aromatic acids.

The aralkylaryl carboxylic acids have important uses as dye intermediates and for the production of esters to be used as plasticizers. These acids owe their particular usefulness in the production of dyes to the fact that they can be caused to ring close, forming leuco compounds of the anthrone type with greater ease than in the case of the corresponding keto acids. In fact, some keto acids are almost impossible to ring close, whereas the corresponding aralkylaryl carboxylic acid ring closes with relative ease. Isolated members of the series have been produced for the most part by reduction of the corresponding keto acids and thus adding an additional process step and making the resulting product more expensive.

According to the present invention the aralkylaryl carboxylic acids are produced directly by reaction with phthalide, eliminating any reduction step of the finished product, and actually giving in most cases better yields than are obtainable with phthalic anhydride itself. The products obtained by the novel process of the present invention are for the most part new, although, as has been pointed out above, isolated members have been produced by the reduction of the corresponding keto acids. In general, the present invention can be carried out under the ordinary conditions of the Friedel-Crafts syntheses with phthalic anhydride, but, as is usually the case in Friedel-Crafts reactions, the conditions are not the same for the production of all acids. The present invention is not directed to new reaction conditions, although, in the case of some specific products, it is desirable to use slightly different conditions than those which give best results with phthalic anhydride. It is an advantage of the present invention that the syntheses which have been carried out with phthalic anhydride may be carried out with phthalide with greater ease and without requiring especially delicate reaction control apart from the ordinary precautions which are a necessity in all Friedel-Crafts syntheses by reason of the nature of the reaction itself, that is to say the products must, of course, be anhydrous and the usual care in preventing undue temperature rise and the use of aluminum chloride of suitable purity should be followed.

Phthalide, being a low melting substance and readily soluble in most organic liquids, can in many cases be used with a mononuclear aryl compound with which it is to react without a solvent. Some of the mononuclear aryl compounds are, however, solids, and at the low or moderate temperatures used in the Friedel-Crafts syntheses a solvent may be required. In general, any solvents which are suitable in Friedel-Crafts syntheses with phthalic anhydride can be used. Examples of solvents of general utility in the process of the present invention are carbon disulfide, tetrachlorethane, nitrobenzene, and other chlorinated aliphatic compounds which do not show much tendency to themselves react with the phthalide.

While the process of the present invention is generally applicable to the reaction of mononuclear aryl compounds of molecular weight greater than 78 with phthalides, it is particularly applicable to reactions in which certain substituted aryl compounds are used, such as, for example, chlorine or bromine substituted aryl compounds which are particularly important in the production of certain intermediate compounds used in making anthrones. Another class of substituted aryl compounds which are very suitable are the phenol ethers such as the methyl, ethyl, propyl, isopropyl, phenols, cresols and xylols, etc.; ethers of dihydroxybenzene such as resorcinol may also be used; other substituted compounds such as nitro- compounds are likewise usable.

The present invention is directed to the production of aralkylaryl carboxylic acids and does not include reactions in which phthalide and mononuclear aryl compounds are condensed under such conditions of temperature as to form in a single process anthrones, this forming the subject matter of co-pending applications.

While usually phthalides unsubstituted in the oxymethyl group are employed, mono-substituted phthalides such as monophenyl phthalide may be used. The di-substituted phthalides in which both hydrogens of the oxymethyl group are substituted in general do not show a satisfactory reactivity. When the mono-substituted compounds are used triarylmethanes are obtained, many of which are of importance in the production of dyes.

Example 1

A mixture of phthalide and a toluene, the latter somewhat in excess of molecular proportions is treated with an amount of aluminum chloride from 2 to 2½ times the weight of phthalide. The aluminum chloride, which should be anhydrous and of good quality, is added to the solution with vigorous stirring at a temperature from 15 to 20° C. After all of the aluminum chloride has been added, the reaction mixture is gradually heated up to 40° C. over a period of about 1 hour, the agitation being continuously maintained. After reaching 40° C. the reaction mixture is maintained at this temperature for 2-2½ hours, and the temperature is then raised to about 60° C. in order to complete the reaction. After reaction is complete, which is usually indicated by the fact that hydrogen chloride is no longer given off, the batch is allowed to cool to room temperature with continued stirring, the aluminum compound then being added slowly to 2,000-3,000 parts by weight of iced 10% sulfuric acid with vigorous agitation. An excellent yield of methylbenzylbenzoic acid is obtained.

Instead of using phthalide, substituted phthalide such as chlor- or nitro- phthalide may be used. The corresponding substituted tolylbenzoic acids are obtained.

*Example 2*

1 mol. of phthalide and from 1 to 1½ mols. of chlorbenzene are mixed with an amount of aluminum chloride from 2-3 times the weight of phthalide at about 18° C. with vigorous stirring. The agitation is maintained for about an hour or until the rapid evolution of hydrogen chloride ceases, whereupon the mixture is heated up to about 40° C. and maintained at this temperature for an hour and a half. The reaction mixture is then heated up to from 40 to 75° C., at which temperature the reaction is completed. After evolution of hydrogen chloride has ceased, the bath is permitted to cool to room temperature and parachlorbenzylbenzoic acid is separated as described in Example 1.

Instead of using chlorbenzene, brombenzene or any of the chlortoluenes may be used, the corresponding benzyl or methylbenzyl benzoic acids being obtained.

*Example 3*

1 mol. of phthalide or di- or tetrachlorphthalide is mixed with 1 mol. of methoxybenzene or methoxytoluene, if desired in the presence of carbon disulfide or tetrachlorethane in order to provide a thinner mixture. An amount of aluminum chloride equal to three times the weight of phthalide or 1½ to 2 times the weight of tetrachlorphthalide as the case may be is added at 20° C., the mixture being gradually heated to about 40° C. over a period of an hour and maintained at this temperature for about 1½ to 2 hours. Thereupon, the temperature may be raised to the boiling point of carbon disulfide and the mixture refluxed until evolution of hydrogen chloride has ceased. When the reaction is complete, the mixture is cooled down to room temperature and the acid separated as described in Example 1.

What is claimed as new is:

1. A process of preparing aralkylaryl carboxylic acids, which comprises bringing about a reaction between a phthalide, a mononuclear aromatic compound of the benzene series having a molecular weight greater than 78 and having at least one hydrogen atom joined to a nuclear carbon atom, and aluminum chloride.

2. A process of preparing aralkylaryl carboxylic acids, which comprises bringing about reaction between a phthalide, an aromatic compound of the benzene series substituted with at least one halogen of atomic weight greater than 19 and having at least one hydrogen atom joined to a nuclear carbon atom, and aluminum chloride.

3. A process of preparing aralkylaryl carboxylic acids, which comprises bringing about reaction between a phthalide, a mononuclear phenol ether having at least one free hydrogen atom attached on the phenol nucleus, and aluminum chloride.

4. A process of preparing a methylbenzyl benzoic acid, which comprises bringing about reaction between toluene, a phthalide and aluminum chloride.

5. A process of preparing a chlorine substituted carboxylic acid, which comprises bringing about reaction between a phthalide, a chlorinated mononuclear aromatic compound having at least one hydrogen atom joined to a nuclear carbon atom and aluminum chloride.

6. A process of preparing a chlorinated benzylbenzoic acid, which comprises bringing about reaction between a phthalide, a chlorbenzene having at least one free hydrogen atom attached to a nuclear carbon atom and aluminum chloride.

7. A process of preparing a chlorinated methylbenzyl benzoic acid, which comprises bringing about reaction between a phthalide, a chlorinated toluene having at least one free hydrogen atom attached to a nuclear carbon atom and aluminum chloride.

8. As a new chemical product, a halogenated aralkylaryl ortho carboxylic acid having the formula $$Ar-CH_2-Ph-COOH$$

in which Ar is a chlorine substituted mononuclear aromatic radical and Ph is a benzene nucleus substituted or unsubstituted.

9. As a new chemical product, parachlorbenzylortho benzoic acid.

10. As a new chemical product, a chlorinated methylbenzylortho benzoic acid.

11. As a new chemical product, monochlormethylbenzylortho benzoic acid.

ALPHONS O. JAEGER.
LLOYD C. DANIELS.